(12) United States Patent  
Straehle

(10) Patent No.: US 6,724,483 B2
(45) Date of Patent: Apr. 20, 2004

(54) METHOD FOR THREE-DIMENSIONALLY, OPTICALLY MEASURING MEASURING OBJECTS

(75) Inventor: Jochen Straehle, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 10/081,769

(22) Filed: Feb. 20, 2002

(65) Prior Publication Data

US 2002/0149778 A1 Oct. 17, 2002

(30) Foreign Application Priority Data

Feb. 21, 2001 (DE) ........................................ 101 08 204

(51) Int. Cl.[7] ................................................. G01B 9/02
(52) U.S. Cl. ...................................................... 356/458
(58) Field of Search ................................. 356/457, 458; 359/30

(56) References Cited

U.S. PATENT DOCUMENTS 5,777,742 A * 7/1998 Marron ........................ 356/458

* cited by examiner

Primary Examiner—Frank G. Font
Assistant Examiner—Michael A. Lyons
(74) Attorney, Agent, or Firm—Kenyon & Kenyon

(57) ABSTRACT

A method is for three-dimensionally, optically measuring measuring objects by comparison with a reference object, where image data of the measuring object are acquired and compared to image data of the reference object, and the measuring object is directly or indirectly assessed with regard to deviations from the reference object. A quick and, at the same time, reliable assessment of the measuring object is achieved in that the measuring object and/or the reference object or a holographic recording of the measuring object and/or of the reference object are/is rotated relative to one another about at least one axis, the image data of the measuring object being acquired and the comparison being performed in various, relative rotational positions, in that an evaluation regarding a maximum agreement of the measuring object with the reference object is performed in the different comparisons, and in that the deviation is assessed in the rotational position determined by the maximum agreement.

20 Claims, 1 Drawing Sheet

METHOD FOR THREE-DIMENSIONALLY, OPTICALLY MEASURING MEASURING OBJECTS

FIELD OF THE INVENTION

The present invention relates to a method for three-dimensionally, optically measuring measuring objects by comparison with a reference object, where image data of the measuring object are acquired and compared to image data of the reference object, and the measuring object is directly or indirectly assessed with regard to deviations from the reference object.

BACKGROUND INFORMATION

In a conventional method, a measuring object undergoes a good-bad assessment by comparison to a reference object, e.g., at the end of a manufacturing operation, the assessment being performed visually, for example. In this context, three-dimensional image data of the reference object can be acquired, for example, and compared to the image data of the measuring object. The reference object and the measuring object must be considered in the same position for a reliable assessment. A relatively complicated adjustment is performed to align the positions.

It is an object of the present invention to provide a method that enables the measuring object to be reliably measured and assessed with relatively little expenditure.

SUMMARY

The above and other beneficial objects of the present invention are achieved by providing a method as described herein.

According to one example embodiment of the present invention, it is provided that the measuring object and/or the reference object or a holographic recording of the measuring object and/or the reference object is/are rotated relative to one another about at least one axis, the image data of the measuring object being acquired and the comparison being performed in various, relative rotational position, that in the various comparisons, an evaluation regarding a maximum agreement of the measuring object with the reference object is performed, and that the assessment of the deviation is performed in the rotational position determined by the maximum agreement.

Rotating the reference object and measuring object or their holographic recordings relatively to one another and comparing the image data during the rotation and the evaluation regarding the best agreement automatically determines those relative rotational positions in which the reference object and the measuring object or their holographic recordings (holograms) have the same orientation. In this specific rotational position, the measurement of the measuring object and the assessment as to whether deviations exist with respect to the reference object are able to be reliably performed, respectively, since errors due to a positional deviation of the two objects are ruled out. In this context, the same evaluation unit may evaluate the comparisons and the assessment.

The measure of holographically recording the measuring object during a production process into which it is incorporated contributes to the method being performed quickly.

An integration of the method during production may be achieved in that the measurement is performed with the assessment of the deviation of the measuring object from the reference object during a production process, an automatic assessment being possible, yet a visual assessment also being possible.

A further possibility for simply implementing the method provides for the image data that three-dimensionally represent the reference object to be stored from the start in an evaluation unit in which the comparison of the acquired image data of the measuring object regarding the maximum agreement and the assessment of the deviation are also performed.

The measure that the image data of the measuring object and/or of the reference object are acquired by a camera contributes to a quick and reliable implementation of the method.

One example embodiment for a simple automatic or visual assessment of the method provides for the deviations of the measuring object from the reference object to be directly assessed following the interferometric superimposition of the two by comparing the obtained interference pattern to a reference interference pattern. The interference pattern may be assessed in a particularly simple manner with respect to characteristic differences in the case of a deviation of the measuring object from the reference object.

One example embodiment for a simple implementation of the method provides for the reference object or its holographic recording to be situated in a reference arm of an interferometer and the measuring object or its holographic recording in an object arm of the interferometer, and for a reference light wave coming from the reference object or its holographic recording and an object light wave coming from the measuring object or its holographic recording to be superimposed at a beam splitter, and for the interference pattern obtained in this manner to be recorded by the camera.

A further example interferometric method provides for the measuring object and a light-deflecting element, in particular a mirror, to be illuminated and light waves reflected by the measuring object and the mirror to be directed at a hologram of the reference object while it is rotated, and for the light superimposed on the hologram to be determined by the camera.

It is provided for the reliable implementation of the method that the holographic recordings of the reference object and/or of the measuring object are obtained via a suitable device that generates the beam path of the interferometer.

Additional example embodiments of the method relate to the assessment being visually performed at a display device on the basis of a representation of prepared image data generated by an evaluation unit or automatically performed in the evaluation unit on the basis of predefined or predefinable criteria.

DETAILED DESCRIPTION

Figure 1:
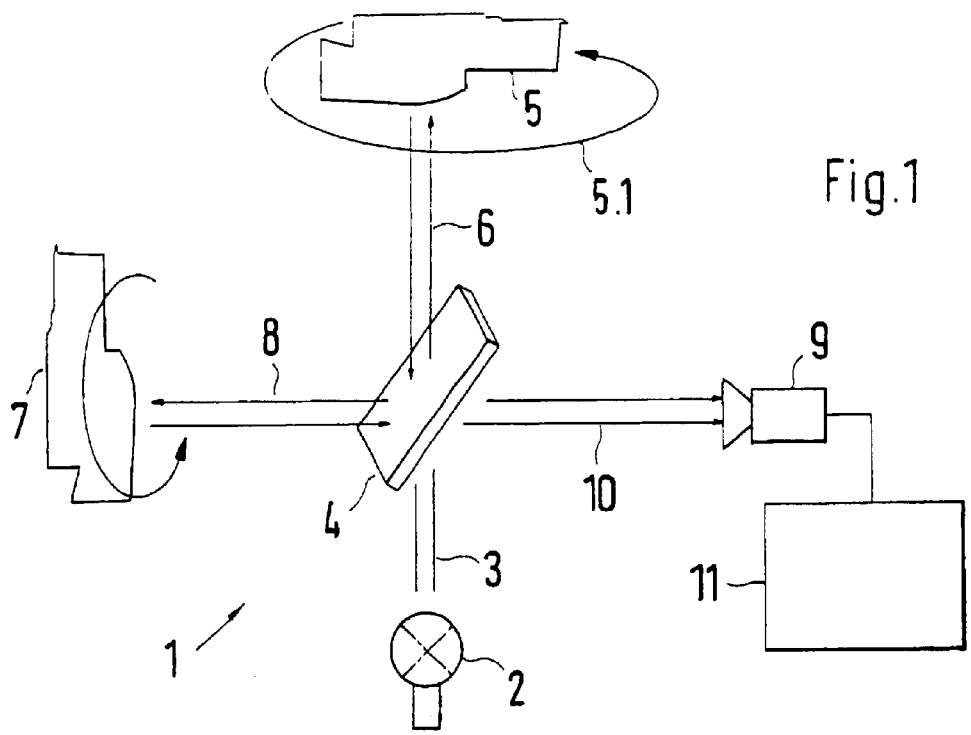
FIG. 1 is a schematic view of an interferometric arrangement for implementing the method according to the present invention.

FIG. 1 illustrates a measuring arrangement 1 in the form of an interferometer that may be suitable for implementing the method. An illumination beam 3 starting from a light source 2 is divided at a beam splitter 4 into an object beam 6 for illuminating a measuring object 5 and a reference beam 8 for illuminating a reference object 7. The light waves, in the form of a measuring wave and a reference wave, returning from measuring object 5 and reference object 7 and having correspondingly deformed wave fronts are superimposed at beam splitter 4 so that a characteristic interference pattern is created that is recorded across a recording beam path 10 by an image recorder or a camera 9, e.g., CCD camera, and is further processed in an evaluation unit 11 provided therein or connected thereto.

If there are deviations between reference object 7 and measuring object 5, they are clearly recognizable in the interference pattern, the three-dimensional structure standing out and an assessment being able to be performed to determine whether measuring object 5 fulfills a good criterion or is to be separated out as being bad. The assessment is able to be performed automatically in evaluation unit 11 on the basis of a reference interference pattern stored therein or may also be performed visually using a display device connected thereto.

While recording the interference pattern, reference object 7 and/or, relatively to that, measuring object 5 are/is rotated about an axis, e.g. the optical axis, as represented by arrows in FIG. 1, in order to assess measuring object 5 with reference object 7 in an appropriate orientation. During the rotation, images are recorded in different rotational positions by camera 9, and the corresponding interference pattern is evaluated in evaluation unit 11 with regard to a maximum agreement of measuring object 5 with reference object 7. Given maximum concordance, the orientation of measuring object 5 and reference object 7 is equal. In this rotational position, the assessment of measuring object 5 regarding deviations with respect to reference object 7 is performed automatically in evaluation unit 11 or by an operator via evaluation unit 11 at a display device connected thereto.

Instead of reference object 7, its hologram may also be situated in the reference space and rotated relative to measuring object 5. It is also possible, for example, during a production process, to make a holographic recording of measuring object 5 and to use it instead of measuring object 5 itself in the measuring arrangement.

Figure 2:
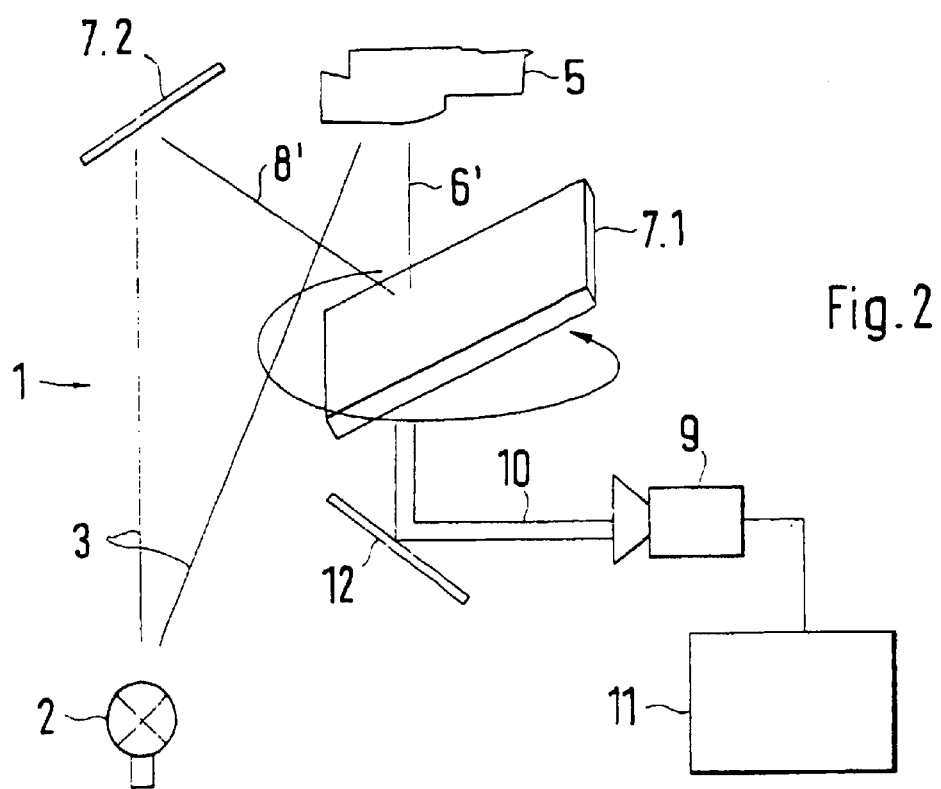
FIG. 2 is a schematic view of an additional interferometric arrangement for implementing the method according to the present invention.

In the example embodiment illustrated in FIG. 2, a holographic recording (reference hologram) 7.1 of reference object 7 is situated in the beam path of an interferometer. Illumination light 3 coming from light source 2 is directed at a mirror 7.2 and measuring object 5. Light waves 8', 6' reflected by mirror 7.2 and measuring object 5 are guided to reference hologram 7.1, while it is rotated about a suitable axis as represent by the arrow. Measuring object 5 may also be rotated. The interference patterns resulting on reference hologram 7.1 during rotation are recorded by camera 9 across a recording beam path 10 using an additional mirror 12 and are further processed as previously described in order to first find the same rotational position of reference object 7 represented by reference hologram 7.1 and of measuring object 5 and to perform the assessment regarding a form deviation of measuring object 5 with respect to the reference object for this corresponding alignment.

The measuring arrangement may also be based on another three-dimensional measuring method in which the reference object and the measuring object are three-dimensionally represented and measured. For example, it is possible to use a triangulation method for three-dimensionally representing the reference object and the measuring object. In this context, to adjust the orientation of the reference object and the measuring object for the assessment, the reference object and the measuring object are rotated relative to one another, and the rotational position corresponding to the maximum concordance of the image data of the measuring object and the reference object is determined.

The recording of the image data of the measuring object and of the reference object, respectively, during rotation is adjusted with respect to speed, to the rotational speed. The rotation may be performed in a uniform, accelerated, or interval-like manner.

To record reference hologram 7.1 and the hologram of the measuring object, respectively, the former may coincide with the hologram in the interferometer's beam path in which it is to be used. For this purpose, the hologram may be produced using the beam path that corresponds to the interferometer's beam path or using the interferometer's beam path itself. Typically, the hologram is an easily manipulable slide that is able to be placed in the beam path using a simple holding device.

Using the described measures, the appropriate orientation of reference object 7 and measuring object 5 important to the assessment is automatically determined during the measurement, the same evaluation unit being used to determine the correct alignment and the assessment being used in virtually the same operation. As a result, a quick measurement and assessment of measuring objects 5, e.g., during a production process, is achieved. Handling is simple. Deviations may be detected and assessed visually or via simple software, in particular if only good-bad results are needed. The criterion for this may be preselected in the evaluation unit. The use of the method may also be suitable under unfavorable environmental conditions.

What is claimed is:

1. A method for three-dimensionally, optically measuring a measuring object by comparison to a reference object, comprising the steps of:

acquiring image data of the measuring object;

comparing the image data of the measuring object to image data of the reference object;

assessing, one of directly and indirectly, the measuring object with regard to deviations from the reference object;

rotating at least one of the measuring object and the reference object relative to one another about at least one axis, the acquiring and the comparing steps being performed at various, relative rotational positions; and evaluating regarding a maximum agreement of the measuring object with the reference object in accordance with the different comparisons, the deviation being assessed in the assessing step in a rotational position in accordance with the maximum agreement.

2. The method according to claim 1, wherein the assessing step is performed during a production process.

3. The method according to claim 1, further comprising the step of storing data that three-dimensionally represent the reference object from a start in an evaluation unit, the comparing and assessing steps being performed in the evaluation unit.

4. The method according to claim 1, further comprising the step of recording image data of at least one of the measuring object and the reference object by a camera.

5. The method according to claim 1, wherein the assessing step includes the substep of directly assessing the deviations of the measuring object from the reference object following an interferometric superimposition of the measuring object and the reference object by comparing an obtained interference pattern to a reference interference pattern.

6. The method according to claim 5, further comprising the steps of:

arranging one of the reference object and a holographic recording of the reference object in a reference arm of an interferometer;

arranging one of the measuring object and a holographic recording of the measuring object in an object arm of the interferometer;

superimposing a reference light wave from the one of the reference object and the holographic recording of the reference object and an object light wave from the one of the measuring object and the holographic recording of the measuring object at a beam splitter; and recording an interference pattern obtained by a camera.

7. The method according to claim 6, further comprising the step of obtaining a holographic recording of at least one of the reference object and the measuring object by a device configured to generate a beam path of the interferometer.

8. The method according to claim 5, further comprising the steps of:

illuminating the measuring object and a light-deflecting element;

directing light waves from the measuring object and the light-deflecting element at a hologram of the reference object while a hologram of the reference object is rotated; and recording light superimposed on the hologram of the reference object by a camera.

9. The method according to claim 8, further comprising the step of obtaining a holographic recording of at least one of the reference object and the measuring object by a device configured to generate a beam path of the interferometer.

10. The method according to claim 1, further comprising the assessing step includes the substep of assessing on the basis of a representation of prepared image data generated by an evaluation unit one of visually at a display device and automatically in the evaluation unit on the basis of one of predefined and predefinable criteria.

11. A method for three-dimensionally, optically measuring a measuring object by comparison to a reference object, comprising the steps of:

acquiring image data of the measuring object;

comparing the image data of the measuring object to image data of the reference object;

assessing, one of directly and indirectly, the measuring object with regard to deviations from the reference object;

rotating a holographic recording of at least one of the measuring object and the reference object relative to one another about at least one axis, the acquiring and the comparing steps being performed at various, relative rotational positions; and evaluating regarding a maximum agreement of the measuring object with the reference object in accordance with the different comparisons, the deviation being assessed in the assessing step in a rotational position in accordance with the maximum agreement.

12. The method according to claim 11, further comprising the step of holographically recording the measuring object during a production process.

13. The method according to claim 11, wherein the assessing step is performed during a production process.

14. The method according to claim 11, further comprising the step of storing data that three-dimensionally represent the reference object from a start in an evaluation unit, the comparing and assessing steps being performed in the evaluation unit.

15. The method according to claim 11, further comprising the step of recording image data of at least one of the measuring object and the reference object by a camera.

16. The method according to claim 11, wherein the assessing step includes the substep of directly assessing the deviations of the measuring object from the reference object following an interferometric superimposition of the measuring object and the reference object by comparing an obtained interference pattern to a reference interference pattern.

17. The method according to claim 16, further comprising the steps of:

arranging one of the reference object and the holographic recording of the reference object in a reference arm of an interferometer;

arranging one of the measuring object and the holographic recording of the measuring object in an object arm of the interferometer;

superimposing a reference light wave from the one of the reference object and the holographic recording of the reference object and an object light wave from the one of the measuring object and the holographic recording of the measuring object at a beam splitter; and recording an interference pattern obtained by a camera.

18. The method according to claim 17, further comprising the step of obtaining a holographic recording of at least one of the reference object and the measuring object by a device configured to generate a beam path of the interferometer.

19. The method according to claim 16, further comprising the steps of:

illuminating the measuring object and a light-deflecting element;

directing light waves from the measuring object and the light-deflecting element at a hologram of the reference object while the hologram of the reference object is rotated; and recording light superimposed on the hologram of the reference object by a camera.

20. The method according to claim 11, further comprising the assessing step includes the substep of assessing on the basis of a representation of prepared image data generated by an evaluation unit one of visually at a display device and automatically in the evaluation unit on the basis of one of predefined and predefinable criteria.

* * * * *